United States Patent
Bennett et al.

(10) Patent No.: US 12,441,891 B2
(45) Date of Patent: Oct. 14, 2025

(54) CHROMATIC GLITTER

(71) Applicant: SUN CHEMICAL CORPORATION, Parsippany, NJ (US)

(72) Inventors: Jami Rae Bennett, Cincinnati, OH (US); Jonathan Daniel Doll, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 899 days.

(21) Appl. No.: 17/315,490

(22) Filed: May 10, 2021

(65) Prior Publication Data

US 2021/0261785 A1   Aug. 26, 2021

Related U.S. Application Data

(63) Continuation of application No. PCT/US2018/060235, filed on Nov. 11, 2018.

(51) Int. Cl.
| | |
|---|---|
| *C09C 1/00* | (2006.01) |
| *A61K 8/02* | (2006.01) |
| *A61K 8/19* | (2006.01) |
| *A61Q 1/04* | (2006.01) |

(52) U.S. Cl.
CPC .......... *C09C 1/0033* (2013.01); *A61K 8/0258* (2013.01); *A61K 8/19* (2013.01); *A61Q 1/04* (2013.01); *C09C 1/0036* (2013.01); *C09C 1/0063* (2013.01); *A61K 2800/436* (2013.01); *C09C 2200/301* (2013.01)

(58) Field of Classification Search
CPC ...... C09C 1/0036; C09D 1/0033; A61Q 1/02; A61Q 1/04; A61Q 1/06; A61Q 1/08
See application file for complete search history.

(56) References Cited

U.S. PATENT DOCUMENTS

| | | | |
|---|---|---|---|
| 5,753,015 A | * | 5/1998 | Sinwald ................. C09D 13/00 106/31.35 |
| 2003/0051634 A1 | | 3/2003 | Takahashi |
| 2005/0095055 A1 | | 5/2005 | Kwan et al. |
| 2013/0129861 A1 | * | 5/2013 | Campomanes Marin ................... A23P 20/10 426/5 |
| 2019/0292372 A1 | * | 9/2019 | Nakamura ............... C09D 7/70 |

FOREIGN PATENT DOCUMENTS

| | | |
|---|---|---|
| EP | 0 554 776 A1 | 8/1993 |
| EP | 0 914 387 B1 | 6/2003 |
| JP | 2009-114392 * | 5/2009 ........... C09D 167/00 |

OTHER PUBLICATIONS

International Search Report and Written Opinion for PCT/US18/60235 filed Nov. 11, 2018, 10 pages.

* cited by examiner

*Primary Examiner* — Pegah Parvini

(74) *Attorney, Agent, or Firm* — Frost Brown Todd LLP

(57) ABSTRACT

High chroma glitter pigments combine large particle interference pigments and absorption colorants to bring about a unique look. Unlike traditional glitter pigments, the high chroma glitter pigment does not exploit metallic coatings to achieve the sparkle effect. These high chroma glitter pigments produce optical effects and coloration without the need for incorporating additional pigments which, in turn, is a benefit from both a formulation and cost standpoint. In addition to a sparkle effect, the present invention provides high chroma over both dark and light backgrounds, which has been thus far unrealized in prior art. Materials used in the present invention are ethically sourced, environmentally friendly, free of plastic, free of heavy metals, and regulated for cosmetic applications.

13 Claims, No Drawings

CHROMATIC GLITTER

PRIORITY

The present application is a continuation of PCT/US18/60235, entitled CHROMATIC GLITTER, filed on Nov. 11, 2018, the disclosure of which is hereby incorporated by reference in its entirety.

BACKGROUND OF THE INVENTION

Glitter is often used as a form of decoration, in, for example, arts and crafts, coatings, and cosmetic industries, and can be used to draw the consumer's eye to products on a shelf. The sparkle or glitter effect is one where individual pigments display an intense specular reflection of light from individual flakes. The glitter effect is distinct from other effects such as metallic effects in that it gives the impression of well-defined points of light emanating from an object. Sparkle pigments are desired in applications which seek to draw attention through eye-catching properties.

Having a glitter that incorporates color is essential in many applications, however, the variety of materials to achieve this end are limited. The manufacture of a sparkle pigment for the use as a decorative glitter has historically used plastic webbing as the substrate which is coated with a metallic coating, then chopped into fine particles. Traditional plastic glitter is often colored by incorporating dyes, organic and/or inorganic pigments into the coating layer of the plastic webbing. When manufacturing plastic-based glitter, the process may release toxic byproducts into the environment. Moreover, plastic is not biodegradable and can accumulate in the environment. Currently, most colored glitter is based on a metalized and colored film of polyethylene terephthalate (PET) that is stamped or ground into a pigment. Because these glitters are plastic based, they have come under increased public scrutiny for accumulating in the environment. This has led to a number of cosmetic manufacturers to reevaluate their use.

Another important characteristic for cosmetic consumers is the feel and texture of the pigments. Traditional plastic glitter gives a rough, sandy texture when applied to the skin and is not to be easily surface treated making it extremely difficult to incorporate into formulations.

An alternative to PET based glitters can currently be found in ultra large flakes of coated or uncoated natural mica or glass. However, these pigments only display appreciable coloration over dark backgrounds. When viewed over white backgrounds, the pigments appear white. The need for a black background limits their applications. Moreover, recent public scrutiny into the supply chain of natural mica as led to an industry-wide trend towards socially conscientious raw materials in pearlescent pigments such as synthetic mica.

Other approaches to make sparkle pigments include using perlite effect pigments with a large particle size. However, use of absorption pigmentation with perlite effect pigments generally yields a chromatically inferior pigment.

Ultra large particle pigments (10-500 μm) may contain an outermost layer which comprises of either/or hydroxyapatite and hydrocalumite with a metal oxide, silver or silver alloy coating to achieve a bright pigment. Unlike the prior art, the present invention does not incorporate hydroxyapatite or hydrocalumite, nor does it rely on silver or silver alloy coating to obtain its bright effect. These types of materials produce a monocolored, white sparkle pigment and do not display the variety of sparkle to glitter colors described in this invention In other reports, the use of a large particle (50-150 μm) 'glitter' interference pigment has been previously used in combination with a smaller sized (10-60 μm) interference pigment to give a color flop effect.

Other traditional chromatic effect pigments will have a particle size distribution of effect pigments of d50<250 μm, which generates a silky shimmer. However, the material does not have a glitter effect. In another example, an $Al_2O_3$ flake is coated with metals, metal oxides, and/or metal sulfides and combined with a colorant to yield a chromatic pigment with high hiding power.

There is a need for a highly chromatic glitter that does not contain plastic or other harmful ingredients.

BRIEF DESCRIPTION

In the current invention, the above challenges are surprisingly solved by making a high chroma glitter pigment which comprises an ultra large flaky substrate and one or more absorption pigments or dyes, and an optional adhesion layer. The high chroma glitter pigments described herein address the health and safety concerns of plastic-based glitter pigments while showing a high degree of chromatic sparkle over black and white backgrounds, which represents an improvement over the current technology. The combination of a large particle pearlescent pigment and an absorption pigment results in an effect pigment with a high-intensity, high chroma sparkle when used as a powder or incorporated into a cosmetic, liquid coating, ink, plastic, paint, powder coating or varnish.

The pigments, a method for their manufacture, and the use of the high chroma glitter pigment are included herein.

In addition to being highly chromatic and producing a sparkle effect, the present invention is capable of creating a color travel effect by combining differing colors of interference and absorption pigments. The present invention uses particles that greatly exceed a diameter of 150 μm to achieve a notable polychromatic sparkle effect.

A glitter effect pigment is incorporated into a given application to give an aesthetic which draws attention and displays a bright, outstanding look. Sparkle can be generated in many ways using materials that range from metals to plastics to minerals and can take form in a variety of particle shapes and sizes. The present invention sets itself apart from prior art by providing a unique sparkle that also incorporates a high degree of chroma over all background shades while maintaining its shiny, glitter appearance. This capability is especially important from a marketing standpoint since brand identity is typically associated with specific colors which are important to incorporate into a packaging design or product.

The present invention can also be considered commercially advantageous because it displays increased chroma over both black and white backgrounds while maintaining a high sparkle effect. The current invention also relies on a large particle size pigments but also provides high chroma over both dark and light backgrounds.

The present invention combines optical effects and coloration without the need for incorporating additional pigments which, in turn, is a benefit from both a formulation and cost standpoint. In addition to a sparkle effect, the present invention provides high chroma over both dark and light backgrounds, which has been thus far unrealized in prior art.

The present invention utilizes materials which are ethically sourced, free of plastic, and undergo a manufacturing process which abstains from generating toxic byproducts.

The materials used in the present invention are also suitable for applications where variables within the processing conditions (including extreme temperatures and the use of solvents) may degrade traditional plastic glitter. In the cosmetic/personal care industry, it is becoming more and more important to customers that the ingredients found within their cosmetic be safe and environmentally friendly. Additionally, recent reports regarding microplastic accumulation in the environment has caused increased scrutiny in this area, and there have been social and regulatory pressures to remove microplastics from cosmetic and personal care products. Additionally, glitter pigments contain synthetic plastics and heavy metals that are not always regulated for cosmetic use. The present invention avoids these materials to create a glitter that is plastic free and composed of materials that are permitted for use in many cosmetic applications.

When used as a cosmetic sparkle pigment, the present invention is associated with many advantages that traditional plastic glitter is unable to provide. The present invention provides a high sparkle effect which is dramatic and striking but creates a completely new look. The aesthetic of the present invention creates a bright, colored and shiny effect which avoids looking dark and spotted from afar or at unforgiving angles. The present invention also has textural advantages over traditional plastic glitter including increased spreadability and smoothness. To further aid in sensorial benefits, the present invention lends itself to be surface treated with allows it to be better formulated and provide further advantages.

DETAILED DESCRIPTION

The present invention describes a high chroma glitter pigment which combines large particle interference pigments and absorption colorants to bring about a unique look. Unlike traditional glitter pigments, the high chroma glitter pigment does not exploit metallic coatings to achieve the sparkle effect. Materials used in the present invention are ethically sourced, environmentally friendly, free of plastic, free of heavy metals, and regulated for cosmetic applications.

The novelty of the present invention is that it uses both absorption and interference colorants to achieve a highly chromatic glitter effect while using non-plastic materials. The particle size range of the present invention may be at least 200 µm. This wide particle size range yields an aesthetic that is eye catching and unique. Additionally, the combination of absorption and interference coloration yields high chroma which has thus far not been attained for any glitter pigments aside from those made using plastic. By combining different absorptive and interference colorants, color travel is attainable in many varieties.

In the invention described herein, a high chroma glitter pigment is made by depositing one or more absorption pigments or dyes on the surface of ultra large pearlescent pigments. An optional adhesion layer may be used to better adhere the absorption pigment or dye to the surface of the ultra large flaky substrate. The high chroma glitter pigment of the current invention can display many different colors, including "two-tone" colors where the reflected color is different from the transmitted color. The combination of an ultra large flaky substrate and an absorption pigment results in an effect pigment with a high-intensity, high chroma sparkle when used as a powder or incorporated into a cosmetic, liquid coating, ink, plastic, paint, powder coating, or varnish.

By absorption pigments, it is meant any pigment where the color is determined primarily by the absorption of light. The absorption of the pigments is due primarily to the electronic band structure of the pigments.

By interference pigments it is meant pigments where the color is determined primarily by the constructive and destructive interference of light. In such pigments, the interference is determined primarily by structural factors within the pigments.

By chroma, it is meant the vector distance from the origin in CIELab color space. The larger the magnitude of the vector, the higher the chroma value, and the more intense the observed color.

Sparkle intensity (Si) is a measurement that is defined as the summed intensity of the light flashes from the individual effect pigments observed on a two-dimensional sample at a specific measuring angle.

Sparkle area (Sa) is a measurement that is defined as the area of the sparkles observed on a two-dimensional sample at a specific measuring angle.

The effect observed in the high chroma glitter pigments is due mainly to the particle shape, size, and composition of the ultra large flaky substrate. The shape of the ultra large flaky substrate is essentially platelet shaped. By platelet shaped, it is meant that z-dimension of the substrate is substantially smaller than the x and y dimensions, forming a flake structure. The shape of the flakes is determined by outline of the substrate in the x and y dimensions, excluding the z-dimension. Due to the large size of the ultra large flaky substrate, the shape can be more or less recognized without the use of specialized equipment. In many situations, the shape of the flakes may be any range of polygonal shapes in the circular to triangular range that are realized from the random fracturing of the flakes due to milling, sieving or coarse particle size reduction. In certain embodiments, the ultra large flaky substrate may have specific shapes due to a specialized stamping or particle size reduction process. In the case where the ultra large flaky substrate has a specific shape, the shape may be one or more of the following types of shapes including ribbon, star, heart, moon, or other shape without affecting the scope of the invention.

The ultra large flaky substrate will have an aspect ratio that is defined as the size of the platelet's largest dimension divided by the platelet's smallest, z-dimension. The dimensions of the ultra large flaky substrate are critical, with a median particle size, d50, at the largest dimension in the range of 200 µm to 5000 µm, and the median thickness or height of the pigments in the range of 0.1 µm-500 µm. The aspect ratio of the ultra large flaky substrate is accordingly in the range of 6-1000. In general, it may be difficult to measure the particle size of such large particles by light scattering. In this case a sieve test may be used to evaluate particle size. If a sieve test is used, then over 35% of the ultra large flaky substrate would be retained on a 200 µm sieve, meaning that less than 65% of the pigment particles are under 200 µm.

The ultra large flaky substrate is comprised of transparent or opaque flaky materials that have a platelet shaped structure. The ultra large flaky substrate may be homogeneous, i.e. made of one material, or it may be heterogeneous, i.e. made of more than one material. For the homogeneous ultra large flaky substrates, examples of suitable materials may include one or more from the following: natural mica, synthetic mica, glass, graphite, graphene, bismuth oxychloride, hexagonal boron nitride, aluminum oxide, kaolin, phyllosilicate clay, montmorillonite clays, hectorite, aluminum hydroxide, micaceous iron oxide, pearlite, diatomaceous earth, silicon dioxide, titanium dioxide, aluminum, zinc, copper, brass, talc, and mixtures thereof, among others.

For the heterogeneous ultra large flaky substrates, the substrate may be coated, porous or hollow. In one embodiment, the ultra large flaky substrate is coated. In this embodiment the ultra large flaky substrate is comprised of a homogeneous ultra large flaky substrate that is coated with one or more layers of another material. The coating material may be a metal oxide or a metal. Examples of the one or more layers of coating material may include tin oxide, titanium dioxide, silicon dioxide, aluminum oxide, aluminum hydroxide, hydrated iron oxide, α-iron oxide, γ-iron oxide, magnetite, zirconium dioxide, cerium oxide, vanadium oxide, manganese oxide, chromium oxide, silver oxide, tungsten oxide, silver, gold, aluminum, and mixtures and alloys thereof. The thickness of the coating material is variable but must allow for partial transparency. In general, the thickness of the coating layers may be in the range of 7 nm to 350 nm.

The color of the high chroma glitter pigments is due mainly to the type of absorption pigment or dye that is adsorbed onto the surface of the ultra large flaky substrate. The absorption pigment or dye may be an organic pigment, an inorganic pigment or a dye. The loading of the absorption pigment or dye in the high chroma glitter pigments is important to the color and is in the range of 0.1% to 10% with respect to the total weight of the high chroma glitter pigment. Though it is possible to use absorption pigment or dye outside this range, at values above 10%, the pigments may exhibit a significant amount of bleed of the absorption pigment or dye, while at values below 0.2%, the pigments typically do not show appreciable color development.

If a dye is used for the absorption pigment, then the types of dyes that can be used in the current invention may comprise all types of dyes, and dye lakes including azo or azo condensed, a metal complex, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphyrazines, porphirines, perinones, rylenes, perylenes, pyronins, diketopyrrolopyrroles, indigo, indigoids, thioindigo, indophenols, naphthalimides, indolenes, isoindolines, isoindolinones, iminoisoindolines, iminoisoindolinones, quinacridones, flavanthrones, indanthrones, anthrapyrimidines, quinophthalones, isoviolanthrones, pyranthrones, or any combination thereof.

If an organic pigment is used for the absorption pigment, then the types of organic pigments that can be used in the current invention may include are all types of azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, or any combinations or lakes thereof.

Another organic pigment or dye to that may be used are those of the laked dye category. If a laked dye is used, then the laked dyes may be one or more from the following: Pigment Orange 17, Pigment Orange 17:1, Pigment Orange 46, Pigment Red 48:1, Pigment Red 48:2, Pigment Red 48:3, Pigment Red 48:4, Pigment Red 48:5, Pigment Red 49, Pigment Red 49:1, Pigment Red 49:2, Pigment Red 49:3, Pigment Red 50:1, Pigment Red 51, Pigment Red 52:1, Pigment Red 52:2, Pigment Red 53:1, Pigment Red 57:1, Pigment Red 58:2, Pigment Red 58:4, Pigment Red 60:1, Pigment Yellow 62, Pigment Red 63:1, Pigment Red 63:2, Pigment Red 64, Pigment Red 64:1, Pigment Red 68, Pigment Red 200, Pigment Red 211, Pigment Brown 5, Pigment Yellow 61, Pigment Yellow 62:1, Pigment Yellow 133, Pigment Yellow 168, Pigment Yellow 169, Pigment Yellow, 100, Pigment Yellow 183, Pigment Yellow 190, Pigment Yellow 191, D&C Black 2, D&C Black 3, D&C Brown 1, FD&C Blue 1, FD&C Blue 2, FD&C Blue 4, FD&C Green 3, D&C Green 5, D&C Green 6, D&C Green 8, Orange B, D&C Orange 4, D&C Orange 5, D&C Orange 10, D&C Orange 11, Citrus Red 2, FD&C Red 3, FD&C Red 4, D&C Red 6, D&C Red 7, D&C Red 17, D&C Red 21, D&C Red 22, D&C Red 27, D&C Red 28, D&C Red 30, Red 29, D&C Red 31, D&C Red 33, D&C Red 34, D&C Red 36, D&C Red 39, FD&C Red 40, D&C Yellow 5, FD&C Yellow 6, D&C Yellow 7, D&C Yellow 8, D&C Yellow 10, D&C Yellow 11, D&C Violet 2, and mixtures and blends thereof.

Inorganic pigment which may be used as absorption pigment may include titanium oxides, iron oxides, vanadium oxides, chromium oxides, chromium hydroxides, silver, manganese oxides, manganese violet, manganese ammonium phosphate tungsten oxides, zinc oxides, cadmium sulfides, zinc sulfides, cadmium mercury sulfides, iron sulfides, aluminosilicates, ferric ferrocyanides, Ferric ammonium ferrocyanide, Prussian blue, ultramarines, aluminum oxides, cerium oxides, spinel pigments, lanthanum hexaborides and mixtures and alloys thereof.

Other pigments which may be employed to add color may include turmeric, carmine, henna, Carmel, annatto, β-carotene, Guaiazulene, indigo, rose madder, carotenoid pigments, lycopene, vegetable carbon, curcumin, capsanthin, capsorubin, canthaxanthin, Chlorphyllin Cu complex, *Euterpe oleracea* extract, *Alkanna Tinctoria* Root Extract, *Bixa orellana* seed extract, beetroot extract, *Clitoria ternatea* flower extract, Paprika, *Calendula officinalis* flower extract, *Sambucus nigra* extract, *Iris germanica* extract, *Rubia tinctorum* extract, *Monascus* extract, *Monascus* extract, *Brassica oleracea* leaf extract, *Rosa canina* fruit oil, *Carthamus tinctorius* seed oil, *Crocus sativus* extract, *Spirulina platensis* extract, *Achillea millefolium* oil, and other fruit color extracts and plant color extracts Additionally, any mixture of transparent dye, organic pigment, or inorganic pigment may be acceptable. Additionally, in the case where a dye is used, the dye may be a polymeric or a non-polymeric dye.

When an organic or inorganic pigment is used for the absorption pigment, the particle size may be such to render the absorption pigment transparent. Although this value changes depending on the type of dye, organic pigment, organic pigment derivatives or inorganic pigment, the d50 of the absorption pigment may be <500 nm.

In an embodiment, the absorption pigment is attached to the surface of the ultra large flaky substrate. The absorption pigment may be chemically attached or physically attached to the surface of the ultra large flaky substrate. By chemically attached it is meant that the absorption pigment forms a direct covalent chemical bond with the surface of the pearlescent pigment, either through a functional group on the absorption pigment or an adhesion promoter or linker. By physically attached it is meant that the absorption pigment is physically adsorbed to the surface of the pearlescent pigment by hydrogen bonds, ionic bonds, for instance Van der Waals forces, and the like.

The absorption pigment may also be attached to the surface of the ultra large flaky substrate, by being encapsulated or "trapped" in one of the metal oxide layers on the pearlescent pigment. In this embodiment, the transparent dye, organic pigment, organic pigment derivative or inorganic pigment may be encapsulated in a layer of silicon dioxide, cerium dioxide, zirconium dioxide or aluminum oxide.

The absorption pigment may also be chemically attached to the surface of the ultra large flaky substrate through the use of an additive or linker molecule and is what is meant by adhesion layer. Such a molecule may be multifunctional and have at least two functional groups that could attach to both the absorption pigment and the surface of the ultra large flaky substrate. Suitable types of adhesion layers may include molecules that contain two or more of the following functional groups from the list including silanes, carboxylic acids, phosphoric acids, phosphonic acids, phosphate, sulfonic acids, sulfates, amines, amides, esters, alcohols, thiols, titanates, and zirconates. The two or more functional groups may be both of the same functional group or they may be of different functional groups without changing the scope of the invention. The additive or linker molecule may be a small molecule or a polymer. If the additive or linker molecule is used as the adhesion layer, it may be present at a loading of 10-100% wt. with respect to weight of the absorption pigment.

In an embodiment, the high chroma glitter pigment may be optionally blended with one or more additives. These additives may improve dispersability, improve the feel, improve the hydrophobicity, improve the oil absorption, etc. Additionally, the additives may modify the surface charge characteristics of the high chroma glitter pigment to be cationic, anionic, neutral or uncharged.

In an embodiment, the high chroma glitter pigment may be incorporated into any type of personal care formulation at an optimized loading for showing the glitter effect. In one embodiment the optimized loading of the high chroma glitter pigment is in the range of 0.01%-20.0% by weight with regards to the total weight of the personal care formulation.

In an embodiment, the high chroma glitter pigment may be incorporated into any type of personal care formulation such as acne treatments, face creams, skin gels, hand creams, body lotions, body butters, moisturizers, water in oil formulation, oil in water formulations, cellulite treatments, body splashes, shampoos, conditioners, bath bombs, facial masks, scrubs, styling products, hair sprays, setting lotions, primers, mousses, gels, pomades, waxes, dry shampoos, serums, oils, hair color, root touch up products, foundation primers, glitter primers, scalp treatments, deodorants, antiperspirants, sun screens, tanning lotions, skin lighteners, lip balms, anti-aging creams, eye serums, body oils, make up removers, shaving creams, shaving gels, and eye creams. In another embodiment, the high chroma glitter pigment is incorporated into any cosmetic formulations such as foundations, pressed powders, loose powders, primers, glitter primers, glitter glue, bronzers, concealers, eye shadows, eye liners, lipsticks, lip glosses, blushes, highlighters, rouges, facial powders and nail polishes.

In one embodiment, the high chroma glitter pigment may be incorporated into a cosmetic formulation. In one embodiment, the high chroma glitter pigment may be incorporated into a cosmetic formulation at a loading in the range of 0.01%-20% with respect to the total weight of the formulation. The high chroma glitter cosmetic formulation may contain one or more ingredient types: liquid diluents, powder diluents, chelating agents, humectants, rheology modifiers, emulsifiers, co-emulsifiers, synergists, emollients, UV filters, thickeners, preservatives, desurfactants, detergents, conditioning agents, stabilizers, stabilizing polymers, fillers, structurants, neutralizers, vitamins, minerals, pearlizing agents, botanical extracts, antioxidants, occlusive, skin feel enhancers, powdered fillers, waxes, oils, mineral oils, shine enhancers, fragrances, binders, dry binders, dyes, inorganic pigments, organic pigments, effect pigments, pearlescent pigments, and other additives and ingredients known to those skilled in the art.

In addition, the high chroma glitter pigment may be used on its own as a glitter powder for use in cosmetic applications. In the case where the high chroma glitter pigment is used on its own, it may be used as a raw powder, or a cosmetic adhesion-promoting layer may be added to the skin prior to using it. The composition of the cosmetic adhesion-promoting layer is not important as long as it allows the high chroma glitter pigment to be adhered to the skin, hair, lips or nail for short periods of time.

In the case where the high chroma glitter pigment is incorporated into a personal care formulation it may be used in conjunction with one or more additional light diffusing or colored pigments without limiting the scope of the invention. Additional light diffusing particles may include platelet-shaped boron nitride, flaky alumina, spherical alumina, spherical silica, pearlescent pigments, nylon-12, polyethylene, polymethylmethacrylate, polystyrene, silicone crosspolymer particles, titanium dioxide, titanium dioxide coated talc, zinc oxide and/or mixtures thereof. Additional colored pigments may include either an organic pigment, an inorganic pigment, a metallic pigment, a pearlescent pigments, and/or mixtures thereof.

Organic pigments may be used for an additional colored pigment. Organic pigments may include all types of azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, r any combinations or lakes thereof.

A type of organic pigment or dye that may be used are those of the laked dye category. If a laked dye is used, then the laked dyes may be one or more from the following list of Pigment Orange 17, Pigment Orange 17:1, Pigment Orange 46, Pigment Red 48:1, Pigment Red 48:2, Pigment Red 48:3, Pigment Red 48:4, Pigment Red 48:5, Pigment Red 49, Pigment Red 49:1, Pigment Red 49:2, Pigment Red 49:3, Pigment Red 50:1, Pigment Red 51, Pigment Red 52:1, Pigment Red 52:2, Pigment Red 53:1, Pigment Red 57:1, Pigment Red 58:2, Pigment Red 58:4, Pigment Red 60:1, Pigment Yellow 62, Pigment Red 63:1, Pigment Red 63:2, Pigment Red 64, Pigment Red 64:1, Pigment Red 68, Pigment Red 200, Pigment Red 211, Pigment Brown 5, Pigment Yellow 61, Pigment Yellow 62:1, Pigment Yellow 133, Pigment Yellow 168, Pigment Yellow 169, Pigment Yellow, 100, Pigment Yellow 183, Pigment Yellow 190, Pigment Yellow 191, D&C Black 2, D&C Black 3, D&C Brown 1, FD&C Blue 1, FD&C Blue 2, FD&C Blue 4, FD&C Green 3, D&C Green 5, D&C Green 6, D&C Green 8, Orange B, D&C Orange 4, D&C Orange 5, D&C Orange 10, D&C Orange 11, Citrus Red 2, FD&C Red 3, FD&C Red 4, D&C Red 6, D&C Red 7, D&C Red 17, D&C Red 21, D&C Red 22, D&C Red 27, D&C Red 28, D&C Red 30, Red 29, D&C Red 31, D&C Red 33, D&C Red 34, D&C Red 36, D&C Red 39, FD&C Red 40, FD&C Yellow 5, FD&C Yellow 6, D&C Yellow 7, D&C Yellow 8, D&C Yellow 10, D&C Yellow 11, D&C Violet 2, and mixtures and blends thereof.

Inorganic pigment may be used for the additional colored pigment(s). Inorganic pigments may include all types of titanium oxides, iron oxides, vanadium oxides, chromium oxides, chromium hydroxides, silver, manganese oxides, manganese violet, manganese ammonium phosphate tungsten oxides, zinc oxides, cadmium sulfides, zinc sulfides, cadmium mercury sulfides, iron sulfides, aluminosilicates, ferric ferrocyanides, Ferric ammonium ferrocyanide, Prussian blue, ultramarines, aluminum oxides, cerium oxides, spinel pigments, lanthanum hexaborides and mixtures and alloys thereof.

Other pigments which may be used as an additional colored pigment may include turmeric, carmine, henna, Carmel, annatto, β-carotene, Guaiazulene, indigo, rose madder, carotenoid pigments, lycopene, vegetable carbon, curcumin, capsanthin, capsorubin, canthaxanthin, Chlorphyllin Cu complex, *Euterpe oleracea* extract, *Alkanna Tinctoria* Root Extract, *Bixa orellana* seed extract, beetroot extract, *Clitoria ternatea* flower extract, Paprika, *Calendula officinalis* flower extract, *Sambucus nigra* extract, *Iris germanica* extract, *Rubia tinctorum* extract, *Monascus* extract, *Monascus* extract, *Brassica oleracea* leaf extract, *Rosa canina* fruit oil, *Carthamus tinctorius* seed oil, *Crocus sativus* extract, *Spirulina platensis* extract, *Achillea millefolium* oil, and other fruit color extracts and plant color extracts.

Metallic pigments may be used as an additional colored pigment(s). Metallic pigments may be platelet shaped metallic pigments having a diameter in the range of d50=1-150 μm. The platelet shaped metallic pigments may be made from aluminum, copper, iron, stainless steel, zinc, silver, titanium, gold, magnesium, zinc-copper alloys, zinc-aluminum alloys, zinc-magnesium alloys, silver-plated glass flakes, and mixtures and alloys thereof.

Pearlescent pigments may be used as additional colored pigment(s). The pearlescent pigment may be any pearlescent pigment known to those skilled in the art. Pearlescent pigments are comprised of a transparent, non-metallic, platelet-shaped substrate that is coated with one or more layers comprised of metal oxides having refractive indices. The pearlescent pigment may be either single or multilayered and has an interference color when viewed over a black background. The interference color of the pearlescent pigment may be silver, yellow, gold, cyan, magenta, red, blue, green, violet, and shades of the aforementioned.

The non-metallic platelet substrate can be made of any material that can be used to make a pearlescent pigment, including, but not limited to natural mica, synthetic mica, bismuth oxychloride, graphite, aluminum oxide, micaceous iron oxide, perlite, silicon dioxide, titanium dioxide-coated mica and iron oxide-coated mica, among others. The size of the platelet-shaped substrate is not critical and depends on the end use of the pigment. In general, the diameter (d50) of the platelet-shaped substrate can be in the range of, but is not limited to, 1 μm to 250 μm and the thickness of the platelet-shaped substrate can be in the range of, but is not limited to, 5 nm to 1 μm.

Metal oxides may be used to coat the non-metallic platelet substrate. Metals may include silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof. The coating may also be comprised of a hydrated oxide of any one of the aforementioned oxides. The coating may also be a doped oxide of any one of the aforementioned oxides. In general, colorless metal oxide layers may be used. The thickness of the metal oxide layers are variable but must allow for partial transparency. In general, the thickness of the metal oxide layers may be in the range of 20 nm to 350 nm.

In one embodiment, the high chroma glitter pigment is incorporated into an ink or coating. Examples of inks and coatings may include automotive coatings, automotive refinish paints, interior architectural coatings, exterior architectural coatings, powder coatings, industrial coating, gravure inks, flexographic inks, paste inks, energy curing (UV or EB) inks, etc. Additionally, high chroma glitter pigment may be used in combination with other effect pigment or organic pigments in all ratios without limiting the scope of the invention.

The content of the high chroma glitter pigment in the coating or ink composition may be in the range of 0.01% to 50% by weight with respect to the other components of the coating system.

The coating or ink composition according to the present invention is obtained by blending the high chroma glitter pigment system of the current technology with a coating resin. The coating resin may be dispersed in a solvent or may be used as a dry powder as in the case of, for example, powder coatings. All types of epoxy, polyester, polyurethane, polyvinyl, cellulose, polyamide, nitrocellulose, acrylic, alkyd, fluorinated resins or the like can be used as the coating resin.

In the case where the high chroma glitter pigment is incorporated into a coating or ink composition it can be used in conjunction with one or more additional light diffusing or colored pigments without limiting the scope of the invention. If a diffusing particle is used, then platelet-shaped boron nitride, flaky alumina, spherical alumina, spherical silica, pearlescent pigments, nylon-12, polyethylene, polymethylmethacrylate, polystyrene, silicone crosspolymer particles, titanium dioxide, titanium dioxide coated talc, zinc oxide and/or mixtures thereof. If an additional colored pigment is used, then it can be either an organic pigment, an inorganic pigment, a metallic pigment, pearlescent pigments, and/or mixtures thereof.

If an organic pigment is used for the for the additional colored pigment, then the types of organic pigments that can be used in the current invention are all types of azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, or any combination thereof.

If an inorganic pigment is used for the additional colored pigment, then the types of inorganic pigments that can be used in the current invention are all types of titanium oxides, iron oxides, vanadium oxides, chromium oxides, manganese oxides, tungsten oxides, cadmium sulfides, zinc sulfides, cadmium mercury sulfides, iron sulfides, aluminosilicates, aluminum oxides, cerium oxides, spinel pigments, lanthanum hexaborides and mixtures and alloys thereof.

If a metallic pigment is used for the additional colored pigment, then the metallic pigment may be platelet shaped metallic pigments having a diameter in the range of d50=1-150 μm. The platelet shaped metallic pigments may be made of any metal from the following list of metals including, aluminum, copper, iron, stainless steel, zinc, silver, titanium, gold, magnesium, zinc-copper alloys, zinc-aluminum alloys, zinc-magnesium alloys, silver-plated glass flakes, and mixtures and alloys thereof.

If a pearlescent pigment is used for the additional colored pigment, then the pearlescent pigment may be any pearlescent pigment known to those skilled in the art. Pearlescent pigments are comprised of a transparent, non-metallic, platelet-shaped substrate that is coated with one or more layers comprised of metal oxides having refractive indices. The pearlescent pigment may be either single or multilayered and has an interference color when viewed over a black background. The interference color of the pearlescent pigment is silver, yellow, gold, cyan, magenta, red, blue, green, violet, and shades of the aforementioned.

The non-metallic platelet substrate may be made of any material used to make a pearlescent pigment. These may include natural mica, synthetic mica, bismuth oxychloride, graphite, aluminum oxide, micaceous iron oxide, perlite, silicon dioxide, titanium dioxide-coated mica and iron oxide-coated mica, among others. The size of the platelet-shaped substrate is not critical and depends on the end use of the pigment. Generally, the diameter of the platelet-shaped substrate may be in the range of 1 μm to 500 μm and the thickness of the platelet-shaped substrate may be in the range of 5 nm to 1 μm.

Metal oxides used to coat the non-metallic platelet substrate may include silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof. The coating may also be comprised of a hydrated oxide of any one of the aforementioned oxides. The coating may also be a doped oxide of any one of the aforementioned oxides. In general, colorless metal oxide layers are may be used. The thickness of the metal oxide layers are variable but must allow for partial transparency. In general, the thickness of the metal oxide layers is may be in the range of 20 nm to 350 nm.

According to the present invention, a crosslinker, water, an organic solvent, an interfacial active agent, a hardener, an ultraviolet absorber, a thickener, a corrosion inhibitor as well as other additives known in the art can be included in the coating composition.

If the coating according to the present invention is an ink, then the high chroma glitter pigment of the current technology may be used in any ink including solvent borne, waterborne, paste, oil, intaglio, heat set, sheet fed, screen and/or energy curable inks. If the high chroma glitter pigment is used in a packaging ink, then they may be used to color both the interior and the exterior of a package or other container. The high chroma glitter pigment-containing ink may be flexographic, screen, sheetfed, heatset, coldest, intaglio, energy cured, gravure, electrophotography, or ink jet.

In one embodiment, the high chroma glitter pigment is incorporated into a plastic part. In this embodiment, the plastic according to the present invention may be obtained by incorporation the high chroma glitter pigment into a plastic material by compounding the high chroma glitter pigment with a plastic at temperatures above the glass transition temperature of the plastic. Suitable methods for incorporating the high chroma glitter pigment include blow molding, extrusion or other techniques used to make plastic films or articles known to those skilled in the art. In one embodiment, the high chroma glitter pigment is incorporated into a plastic may be at a loading in the range of 0.01%-20% with respect to the total weight of the formulation.

In the case where the high chroma glitter pigment is incorporated into a plastic any suitable plastics may be used including one or more from the group including polypropylene, polyethylene, polyester, polyurethane, polyacrylate, polyolefin, epoxy, polyamide, poly(vinyl chloride), and poly (vinylidene fluoride), as well as any acrylic, alkyd, fluoropolymers, and blends thereof.

In the case where the high chroma glitter pigment is incorporated into a plastic it can be used in conjunction with one or more additional light diffusing or colored pigments without limiting the scope of the invention. If a diffusing particle is used, then platelet-shaped boron nitride, flaky alumina, spherical alumina, spherical silica, pearlescent pigments, nylon-12, polyethylene, polymethylmethacrylate, polystyrene, silicone crosspolymer particles, titanium dioxide, zinc oxide and/or mixtures thereof. If an additional colored pigment is used, then it can be either an organic pigment, an inorganic pigment, a metallic pigment, pearlescent pigments, and/or mixtures thereof.

If an organic pigment is used for the for the additional colored pigment, the types of organic pigments that may be used include all types of azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, or any combination thereof.

If an inorganic pigment is used for the additional colored pigment, the types of inorganic pigments that may be used include all types of titanium oxides, iron oxides, vanadium oxides, chromium oxides, manganese oxides, tungsten oxides, cadmium sulfides, zinc sulfides, cadmium mercury sulfides, iron sulfides, aluminosilicates, aluminum oxides, cerium oxides, spinel pigments, lanthanum hexaborides and mixtures and alloys thereof.

If a metallic pigment is used for the additional colored pigment, then the metallic pigment may be platelet shaped metallic pigments having a diameter in the range of d50=1-150 μm. The platelet shaped metallic pigments may be made of any metal from the following list of metals including, aluminum, copper, iron, stainless steel, zinc, silver, titanium, gold, magnesium, zinc-copper alloys, zinc-aluminum alloys, zinc-magnesium alloys, silver-plated glass flakes, and mixtures and alloys thereof.

If a pearlescent pigment is used for the additional colored pigment, the pearlescent pigment may be any pearlescent pigment known to those skilled in the art. Pearlescent pigments are comprised of a transparent, non-metallic, platelet-shaped substrate that is coated with one or more layers comprised of metal oxides having refractive indices. The pearlescent pigment can be either single or multilayered and has an interference color when viewed over a black background. The interference color of the pearlescent pigment is silver, yellow, gold, cyan, magenta, red, blue, green, violet, and shades of the aforementioned.

The non-metallic platelet substrate may be made of any material that can be used to make a pearlescent pigment. These may include natural mica, synthetic mica, bismuth oxychloride, graphite, aluminum oxide, micaceous iron oxide, perlite, silicon dioxide, titanium dioxide-coated mica and iron oxide-coated mica, among others. The size of the platelet-shaped substrate is not critical and depends on the end use of the pigment. Generally, the diameter of the platelet-shaped substrate may be from 1 µm to 500 µm and the thickness of the platelet-shaped substrate may be in the range from 5 nm to 1 µm.

Metal oxides used to coat the non-metallic platelet substrate may include silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof. The coating may also be comprised of a hydrated oxide of any one of the aforementioned oxides. The coating may also be a doped oxide of any one of the aforementioned oxides. Generally, colorless metal oxide layers may be used. The thickness of the metal oxide layers is variable but also must allow for partial transparency. Generally, the thickness of the metal oxide layers may be from about 20 nm to 350 nm.

According to the present invention, a crosslinker, plasticizer, flow agent, as well as other additives known in the art may be included in the plastic in addition to the high chroma glitter pigment.

In one embodiment, the high chroma glitter pigment is incorporated into an art or crafting products. Suitable types of art and craft products include, glues, tape, modeling clays, clay, polymer clay, crayons, colored pens and pencils, ink pads, stamps, slimes, sticky-back sheets, markers, finger paints, water colors, oil paint, Oil pastels, colored chalk, tempera stick, tempera paint, acrylic paint, water-based paints, and textiles.

The present invention has been described in detail, including different embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

Inventive Example 1:0.78 g of D&C Red 7 Ca lake (Sun Chemical, Carlstadt, USA) and 77 g of a large particle size, red pearlescent synthetic mica pigment was dispersed in a hot polar protic solvent. Once the mixture was homogeneous, the resulting powder was isolated and dried to give a bright red glitter pigment.

Comparative Example 2: A large particle size, red pearlescent synthetic mica pigment (same as Inventive Example 1, except without the D&C Red 7 Ca lake).

Comparative Example 3:8.56 g of D&C Red 7 Ca lake (Sun Chemical, Carlstadt, USA) and 77 g of a 10-60 micron, red pearlescent synthetic mica pigment was dispersed in a hot polar protic solvent. Once the mixture was homogencous, the resulting powder was isolated and dried to give a bright red glitter pigment.

Comparative Example 4: The marketed NYX 2L109 RED, which is a metalized PET glitter pigment.

Inventive Example 5:8.56 g of D&C Red 7 Ca lake (Sun Chemical, Carlstadt, USA) and 77 g of a large particle size, red pearlescent synthetic mica pigment was dispersed in a hot polar protic solvent. Once the mixture was homogeneous, the resulting powder was isolated and dried to give a bright red glitter pigment.

Inventive Example 6:0.195 g of FD&C Blue 1 A1 lake (Sun Chemical, Carlstadt, USA) and 77 g of a large particle size, blue pearlescent synthetic mica pigment was dispersed in a hot polar protic solvent. Once the mixture was homogeneous, the resulting powder was isolated and dried to give a bright blue glitter pigment.

Inventive Example 7:0.78 g of FD&C Yellow 5 A1 lake (Sun Chemical, Carlstadt, USA) and 77 g of a large particle size, gold pearlescent synthetic mica pigment was dispersed in a hot polar protic solvent. Once the mixture was homogeneous, the resulting powder was isolated and dried to give a bright yellow to green glitter pigment.

Inventive Example 8:0.78 g of D&C Red 7 Ca lake (Sun Chemical, Carlstadt, USA) 25.67 g of a large particle size red pearlescent synthetic mica pigment, 25.67 g of a large particle size blue pearlescent synthetic mica pigment and 25.67 g of a large particle size gold pearlescent synthetic mica pigment was dispersed in a hot polar protic solvent. Once the mixture was homogeneous, the resulting powder was isolated and dried to give a bright red glitter pigment displaying multicolored sparkle flecks.

Example 9—Particle Size Measurement

TABLE 1

Particle size distribution of Examples 1-8

| Sample ID | >212 µm | <212 µm |
| --- | --- | --- |
| Inventive Example 1 | 69% | 31% |
| Comparative Example 2 | 63% | 37% |
| Comparative Example 3 | 7% | 92% |
| Comparative Example 4 | 0% | 100% |
| Inventive Example 5 | 70% | 30% |
| Inventive Example 6 | 58% | 42% |
| Inventive Example 7 | 55% | 45% |
| Inventive Example 8 | 70% | 30% |

100 g of material was placed on top of a sieve with a 212 µm screen. The pigment was sieved via vibration for sieved for 20 min. The residue on top of the 212 µm sieve and in the bottom tray were weighted. Table 1 includes the percentage of total pigment on each level.

It can be seen that over 50% of the pigment of the inventive examples have failed to go through the 212 µm screen, while >50% of the Comparative samples passed through the screen.

Example 10—Color Measurements

To evaluate the pigments for sparkle and chroma, 0.5 g of the pigment from Examples 1-8 were dispersed in 4.5 g of a solvent-borne, acrylic automotive refinish system. The mixture was blended in a centrifugal mixed for 3 minutes at 3000 RPM. Once mixed, the material was drawn down on a black and white BYK chart using a 1.5 mil Bird Applicator. The samples were dried, and the Chroma (C*) was measured over a white background using a BYK MA-98 multiangle spectrophotometer. The data are recorded in Table 2.

TABLE 2

Si, Sa and C* values for Examples 1-4.

| Sample ID | $(C^{*45}_{white})$ | $Si^{15}_{white}$ | $Si^{15}_{black}$ | $Sa^{15}_{black}$ |
|---|---|---|---|---|
| Inventive Example 1 | 19.23 | 19.84 | 84.71 | 21.41 |
| Comparative Example 2 | 7.66 | 18.98 | 61.16 | 27.69 |
| Comparative Example 3 | 58.68 | 6.63 | 8.08 | 27.88 |
| Comparative Example 4 | 5.51 | 56.3 | 115.0 | 21.17 |
| Inventive Example 5 | 53.38 | 27.53 | 50.08 | 32.1 |
| Inventive Example 6 | 11.97 | 25.64 | 54.53 | 31.46 |
| Inventive Example 7 | 28.82 | 45.5 | 69.18 | 31.89 |
| Inventive Example 8 | 24.55 | 45.74 | 66.55 | 28.73 |

Table 2 shows that Example 1 and 5-8 have a higher Chroma over a white background than both Comparative Examples 2 and 4. Comparative Example 3 has a higher chroma, which is attributed to the much smaller size of the pigment (Table 1).

In regard to sparkle intensity (Si) and area (Sa), Example 1 has the highest values when compared to Comparative Example 3, which is attributed to the larger particle size (Table 1). Example 1 has a lower Si over black and a higher Sa than Comparative Examples 2 and 4, while it has a much larger Si over white. This indicates that the sparkle of Example 1 is intense over any background, giving it better formulation flexibility when compared to other large particle pigments. The other Inventive examples (5-8) have similar high sparkle to Example 1.

Example 9—Cosmetic Application: Inventive Example 1 was applied to the skin by first applying a thin coat of adhesive (such as a waxy balm, petroleum jelly, NYK or E.L.F. glitter primer) using a brush or finger to the desired application spot. Then, with a pressing motion, the effect pigment was applied onto surface which contained adhesive. Inventive Example 1 was also applied onto the desired area using a brush. Excess glitter was removed by tapping around the area of which the glitter was applied. The use of Example 1 provides a glittery red finish on the skin.

Example 10—Cosmetic Application: Inventive Example 1 was incorporated into a cosmetic lip gloss via the formulation in Table 3. The ingredients of Phase I were added together and heated at 80° C. while mixing until melted and thoroughly mixed. Once melted, the effect pigment was added into the stirring mixture and homogenized until uniform. Once uniform, the mixture was left to cool before pouring into packaging. The use of Inventive Example 1 provides a glittery red finish when applied to the lips.

TABLE 3

Cosmetic lip gloss formulation

| Ingredient | Wt % |
|---|---|
| Polybutene | 40.3 |
| Pentaerythrityl Tetraisostearate | 15.0 |
| Octyldodecanol | 15.0 |
| Tridecyl Trimellitate | 10.1 |
| Hydrogenated Polydecene | 2.0 |
| C10-C30 Cholesterol, Lanosterol Esters | 9.1 |
| Cera Alba | 2.2 |
| Methylparaben | 0.3 |
| Propylparaben | 0.2 |
| PEG-8, Tocopherol, Ascorbyl Palmitate, | 0.2 |

TABLE 3-continued

Cosmetic lip gloss formulation

| Ingredient | Wt % |
|---|---|
| Ascorbic Acid, Citric Acid | |
| Tocopheryl Acetate | 0.3 |
| Hydrogenated Castor Oil | 1.4 |
| Effect Pigment (Inv. Ex. 1) | 3.9 |
| Total | 100.0 |

Example 11—Incorporation into Plastics: Inventive Example 1 was incorporated into a plastic via the formulation in Table 4. Ingredients of Phase I were combined and mixed thoroughly. The mixed contents of Phase I were added to Phase II and mixed until an equal dispersion was achieved. An Injection molder was heated to 450° C., the mixture was added to the hopper and run through, then allowed to cool before removing. The resulting extruded chips had a glittery appearance.

TABLE 4

Plastic Formulation.

| | Ingredient | Wt % |
|---|---|---|
| Phase I | Polypropylene Powder | 19.13 |
| | Zinc Stearate | 0.50 |
| | Effect Pigment (Inv. Ex. 1) | 4.00 |
| Phase II | Polypropylene Powder | 76.37 |
| | Total | 100.00 |

Example 12—Used as a dry powder: A piece of paper was coated with a typical craft glue. The pigment of Inventive Example 1 was sprinkled over the glue while it was wet and allowed to dry. Any unadhered glitter was shaken off. The resulting display showed a saturated glitter effect in the areas of the display where the glue was applied.

What is claimed is:

1. A high chroma glitter pigment comprising an ultra large flaky substrate, one or more absorption pigments or dyes, and an optional adhesion layer, wherein the ultra large flaky substrate comprises a large particle pearlescent pigment comprising a transparent, non-metallic, platelet-shaped substrate, selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a median diameter (50) from 1 μm to 500 μm, and is coated with one or more layers of metal oxides, each having its own refractive index, and wherein the ultra large flaky substrate has a median particle size, d50, at the largest dimension of greater than 500 μm, and a median thickness or height in the range of 0.1 μm-500 μm.

2. A composition comprising the high chroma glitter pigment of claim 1, wherein:
   a. the composition is a cosmetic, personal care product, coating, ink, plastic, paint, crafting product or powder coating; or
   b. the composition is an ink or coating is selected from the group consisting of flexographic, screen, paste, sheet-fed, gravure, inkjet, energy curable, solvent borne, waterborne, and heat set curable inks and coatings, optionally wherein and wherein the ink or coating comprises a coating resin selected from the group consisting of epoxy, polyester, polyurethane, polyvinyl, cellulose, polyamide, nitrocellulose, acrylic, alkyd, fluorinated resins, and blends thereof; or c. a crafting product selected from the group consisting of a glue, tape, modeling clays, clay, polymer clay, crayons, colored pens and pencils, ink pads, stamps, slimes, sticky-back sheets, markers, finger paints, water colors, oil paint, oil pastels, colored chalk, tempera stick, tempera paint, acrylic paint, water-based paints, and textiles;

and wherein the glitter pigment is present in an amount of about 0.01%-50%, with respect to the total weight of the formulation.

3. The composition of claim 2, wherein the glitter pigment is present in an amount of about 0.01%-20%.

4. The composition of claim 2, further comprising one or more additional light diffusing particles or colored pigments, wherein the light diffusing particle is selected from the group consisting of platelet-shaped boron nitride, flaky alumina, spherical alumina, spherical silica, pearlescent pigments, nylon-12, polyethylene, polymethylmethacrylate, polystyrene, silicone crosspolymer particles, titanium dioxide, titanium dioxide-coated talc, zinc oxide and/or mixtures thereof.

5. The composition of claim 2, further comprising one or more platelet shaped metallic pigments having a diameter from about d50=1-150 µm, wherein the platelet shaped metallic pigment is selected from the group consisting of aluminum, copper, iron, stainless steel, zinc, silver, titanium, gold, magnesium, zinc-copper alloys, zinc-aluminum alloys, zinc-magnesium alloys, silver-plated glass flakes, and mixtures and alloys thereof.

6. A high chroma glitter pigment comprising an ultra large flaky substrate, one or more absorption pigments or dyes, and an optional adhesion layer, wherein the ultra large flaky substrate comprises a pearlescent pigment and wherein the ultra large flaky substrate has a median particle size, d50, at the largest dimension in the range of 200 µm to 5000 µm, and the median thickness or height in the range of 0.1 µm-500 µm; also comprising a transparent, non-metallic, platelet-shaped substrate having a median diameter (d50) from 200-5000 µm, and a thickness from 5 nm to 1 µm, coated with one or more layers of metal oxides, each having its own refractive index, wherein the coating material has a thickness from about 7 nm to 350 nm, and wherein loading of the absorption pigment or dye is from about 0.1% to 10%, with respect to total weight of the pigment.

7. A high chroma glitter pigment comprising an ultra large flaky substrate, one or more absorption pigments or dyes, and an optional adhesion layer, wherein the ultra large flaky substrate has a median particle size, d50, at the largest dimension in the range of 200 µm to 5000 µm, and the median thickness or height of the pigments in the range of 0.1 µm-500 µm and comprises a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, and said platelet-shaped substrate having a median diameter (d50) from 200-5000 µm, and a thickness from about 5 nm to 1 µm, and is coated with one or more layers of metal oxides, each having its own refractive index, wherein loading of the absorption pigment or dye is from about 0.1% to 10%, with respect to total weight of the pigment.

8. A high chroma glitter pigment comprising an ultra large flaky platelet-shaped substrate coated with a coating material having one or more layers of metal oxide or a metal, with an aspect ratio from about 6-1000, having one or more absorption pigments or dyes, and an optional adhesion layer, wherein the ultra large flaky substrate comprises a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, and said platelet-shaped substrate having a median diameter (d50) from 1 µm-500 µm, and a thickness from about 5 nm to 1 µm, and is coated with one or more layers of metal oxides, each having its own refractive index, wherein loading of the absorption pigment or dye is from about 0.1% to 10%, with respect to total weight of the pigment; wherein the optional adhesion layer includes molecules that contain two or more functional groups selected from the group consisting of silanes, carboxylic acids, phosphoric acids, phosphonic acids, wherein the coating material is selected from the group consisting of tin oxide, titanium dioxide, silicon dioxide, aluminum oxide, aluminum hydroxide, hydrated iron oxide, a-iron oxide, y-iron oxide, magnetite, zirconium dioxide, cerium oxide, vanadium oxide, manganese oxide, chromium oxide, silver oxide, tungsten oxide, silver, gold, aluminum, and mixtures and alloys thereof.

9. A high chroma glitter pigment comprising an ultra large flaky platelet-shaped substrate coated with a coating material having one or more layers of metal oxide or a metal having a thickness from about 7 nm to 350 nm, with an aspect ratio from about 6-1000, having one or more absorption pigments or dyes, and an optional adhesion layer, wherein the ultra large flaky substrate comprises a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a thickness from 5 nm to 1 µm, that is coated with one or more layers of metal oxides, each having its own refractive index, and a median thickness or height in the range of 0.1 µm-500 µm, wherein loading of the absorption pigment or dye is from about 0.1% to 10%, with respect to total weight of the pigment, and said platelet-shaped substrate having a median diameter (d50) from 1 µm-500 µm; wherein the optional adhesion layer includes molecules that contain two or more functional groups selected from the group consisting of silanes, carboxylic acids, phosphoric acids, phosphonic acids, wherein the coating material is selected from the group consisting of tin oxide, titanium dioxide, silicon dioxide, aluminum oxide, aluminum hydroxide, hydrated iron oxide, a-iron oxide, y-iron oxide, magnetite, zirconium dioxide, cerium oxide, vanadium oxide, manganese oxide, chromium oxide, silver oxide, tungsten oxide, silver, gold, aluminum, and mixtures and alloys thereof, wherein the absorption pigment is physically attached to the surface of the ultra large flaky substrate; wherein the linker molecule is multifunctional and has at least two functional groups to attach to the absorption pigment and the surface of the ultra large flaky substrate.

10. A high chroma glitter pigment comprising an ultra large flaky substrate, one or more absorption pigments or dyes, and an optional adhesion layer, wherein the ultra large flaky substrate, comprises a pearlescent pigment, that is greater than 500 µm, having a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a thickness from 5 nm to 1 µm, that is coated with one or more layers of metal oxides, each having its own refractive index, and a median thickness or height in the range of 0.1 µm-500 µm, wherein loading of the absorption pigment or dye is from about 0.1% to 10%, with respect to total weight of the pigment.

11. A high chroma glitter pigment comprising an ultra large flaky substrate, having an aspect ratio from about 6-1000, and a median thickness from about 0.5 µm-50 µm; one or more absorption pigments or dyes; and an optional adhesion layer; wherein the ultra large flaky substrate, comprises a pearlescent pigment, that is greater than 500 µm, having a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a thickness from 5 nm to 1 µm, that is coated with one or more layers of metal oxides, each having its own refractive index, and a median thickness or height in the range of 0.1 µm-500 µm, wherein loading of the absorption pigment or dye is from about 0.1% to 10%, with respect to total weight of the pigment, and wherein the optional adhesion layer includes molecules that contain two or more functional groups selected from the group consisting of silanes, carboxylic acids, phosphoric acids, phosphonic acids, phosphate, sulfonic acids, sulfates, amines, amides, esters, alcohols, thiols, titanates, and zirconates.

12. A high chroma glitter pigment comprising an ultra large flaky substrate wherein the ultra large flaky substrate is coated with a coating material having a thickness from about 7 nm to 350 nm, and having one or more layers of a metal oxide or a metal, optionally wherein the coating material is selected from the group consisting of tin oxide, titanium dioxide, silicon dioxide, aluminum oxide, aluminum hydroxide, hydrated iron oxide, α-iron oxide, γ-iron oxide, magnetite, zirconium dioxide, cerium oxide, vanadium oxide, manganese oxide, chromium oxide, silver oxide, tungsten oxide, silver, gold, aluminum, and mixtures and alloys thereof; having an aspect ratio from about 6-1000, a median thickness from about 0.5 µm-50 µm; having one or more absorption pigments or dyes; having an optional adhesion layer; wherein the ultra large flaky substrate, comprises a pearlescent pigment, that is greater than 500 µm, having a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a thickness from 5 nm to 1 µm, that is coated with one or more layers of metal oxides, each having its own refractive index, and a median thickness or height in the range of 0.1 µm-500 µm, wherein loading of the absorption pigment or dye is from about 0.1% to 10%, with respect to total weight of the pigment, and wherein the optional adhesion layer includes molecules that contain two or more functional groups selected from the group consisting of silanes, carboxylic acids, phosphoric acids, phosphonic acids, phosphate, sulfonic acids, sulfates, amines, amides, esters, alcohols, thiols, titanates, and zirconates; and in addition, wherein, the absorption pigment is attached to the surface of the ultra large flaky substrate, optionally wherein:

a. the absorption pigment is chemically attached to the surface of the ultra large flaky substrate through the use of an additive or linker molecule, wherein the linker molecule is multifunctional and has at least two functional groups to attach to the absorption pigment and the surface of the ultra large flaky substrate; or
b. the absorption pigment is physically attached to the surface of the ultra large flaky substrate; or
c. the absorption pigment is attached to the surface of the ultra large flaky substrate by encapsulation in a metal oxide layers on the pearlescent pigment.

13. A high chroma glitter pigment comprising an ultra large flaky substrate wherein the ultra large flaky substrate is coated with a coating material having a thickness from about 7 nm to 350 nm, and having one or more layers of a metal oxide or a metal, optionally wherein the coating material is selected from the group consisting of tin oxide, titanium dioxide, silicon dioxide, aluminum oxide, aluminum hydroxide, hydrated iron oxide, α-iron oxide, γ-iron oxide, magnetite, zirconium dioxide, cerium oxide, vanadium oxide, manganese oxide, chromium oxide, silver oxide, tungsten oxide, silver, gold, aluminum, and mixtures and alloys thereof; having an aspect ratio from about 6-1000, a median thickness from about 0.5 µm-50 µm, having one or more absorption pigments or dyes, wherein the absorption pigment is attached to the surface of the ultra large flaky substrate by encapsulation in one of the metal oxide layers on the pearlescent pigment; having an optional adhesion layer; wherein the ultra large flaky substrate, comprises a pearlescent pigment, that is greater than 500 µm, having a transparent, non-metallic, platelet-shaped substrate selected from the group consisting of natural mica, synthetic mica, bismuth oxychloride, graphite, aluminum oxide, micaceous iron oxide, perlite, silicon dioxide, titanium dioxide-coated mica and iron oxide-coated mica, having a thickness from 5 nm to 1 µm, that is coated with one or more layers of metal oxides, each having its own refractive index, and a median thickness or height in the range of 0.1 µm-500 µm, wherein loading of the absorption pigment or dye is from about 0.1% to 10%, with respect to total weight of the pigment, and wherein the optional adhesion layer includes molecules that contain two or more functional groups selected from the group consisting of silanes, carboxylic acids, phosphoric acids, phosphonic acids, phosphate, sulfonic acids, sulfates, amines, amides, esters, alcohols, thiols, titanates, and zirconates; and in addition, wherein, the absorption pigment is attached to the surface of the ultra large flaky substrate, optionally wherein:

a. the absorption pigment is chemically attached to the surface of the ultra large flaky substrate through the use of an additive or linker molecule, wherein the linker molecule is multifunctional and has at least two functional groups to attach to the absorption pigment and the surface of the ultra large flaky substrate; or
b. the absorption pigment is physically attached to the surface of the ultra large flaky substrate; or
c. the absorption pigment is attached to the surface of the ultra large flaky substrate by encapsulation in a metal oxide layers on the pearlescent pigment.

* * * * *